(12) United States Patent
Adam et al.

(10) Patent No.: US 9,853,820 B2
(45) Date of Patent: Dec. 26, 2017

(54) INTELLIGENT DELETION OF REVOKED DATA

(71) Applicant: Microsoft Technology Licensing, LLC, Redmond, WA (US)

(72) Inventors: Preston Derek Adam, Woodinville, WA (US); Adrian F. Teran, Redmond, WA (US); Yogesh A. Mehta, Redmond, WA (US); John C. Spaith, Bellevue, WA (US); Steve Roger May, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/788,377

(22) Filed: Jun. 30, 2015

(65) Prior Publication Data
US 2017/0005809 A1    Jan. 5, 2017

(51) Int. Cl.
*H04L 29/06* (2006.01)
*H04L 9/32* (2006.01)
*G06F 21/62* (2013.01)
*G06Q 10/10* (2012.01)

(52) U.S. Cl.
CPC ........ *H04L 9/3268* (2013.01); *G06F 21/6218* (2013.01); *G06Q 10/10* (2013.01); *H04L 63/0823* (2013.01); *G06F 2221/2143* (2013.01)

(58) Field of Classification Search
CPC .......................... H04L 9/3268; H04L 63/0823
See application file for complete search history.

(56) References Cited

U.S. PATENT DOCUMENTS

| | | |
|---|---|---|
| 5,495,533 A | 2/1996 | Linehan et al. |
| 5,787,131 A | 7/1998 | Bottomley |
| 5,897,661 A | 4/1999 | Baranovsky et al. |

(Continued)

FOREIGN PATENT DOCUMENTS

| | | |
|---|---|---|
| CN | 1653422 | 8/2005 |
| CN | 1713756 | 12/2005 |

(Continued)

OTHER PUBLICATIONS

"Final Office Action", U.S. Appl. No. 13/898,368, dated Dec. 2, 2015, 19 pages.

(Continued)

*Primary Examiner* — Mahfuzur Rahman (57) ABSTRACT

A program on a device communicates with services of an organization and obtains data associated with the organization (also referred to as organization data). The organization data is optionally encrypted using one or more encryption keys, in which case the program has access to one or more decryption keys allowing the organization data to be decrypted and used at the device. Situations can arise in which the organization data stored on the device is to no longer be accessible to a user and/or the device, which is also referred to as the data being revoked. In response to organization data being revoked at the device, various techniques are used to intelligently delete the data, which refers to determining, based on the revocation that occurred and the nature of the data on the device, which data on the device is to be deleted from the device.

20 Claims, 4 Drawing Sheets

(56) References Cited

U.S. PATENT DOCUMENTS

| | | |
|---|---|---|
| 5,944,783 A | 8/1999 | Neiten |
| 5,966,263 A | 10/1999 | Freitas et al. |
| 5,974,503 A | 10/1999 | Venkatesh et al. |
| 6,016,402 A | 1/2000 | Thomas et al. |
| 6,028,725 A | 2/2000 | Blumenau |
| 6,041,386 A | 3/2000 | Bello |
| 6,067,199 A | 5/2000 | Blumenau |
| 6,076,143 A | 6/2000 | Blumenau |
| 6,134,062 A | 10/2000 | Blumenau |
| 6,151,665 A | 11/2000 | Blumenau |
| 6,170,037 B1 | 1/2001 | Blumenau |
| 6,170,055 B1 | 1/2001 | Meyer et al. |
| 6,253,300 B1 | 6/2001 | Lawrence et al. |
| 6,292,317 B1 | 9/2001 | Alexander |
| 6,292,790 B1 | 9/2001 | Krahn et al. |
| 6,550,011 B1 | 4/2003 | Sims, III |
| 6,665,784 B2 | 12/2003 | Ihde et al. |
| 6,727,896 B2 | 4/2004 | Tsang |
| 6,728,379 B1 | 4/2004 | Ishibashi et al. |
| 6,789,162 B1 | 9/2004 | Talagala et al. |
| 6,944,742 B1 | 9/2005 | Shoff et al. |
| 6,968,973 B2 | 11/2005 | Uyttendaele et al. |
| 6,996,696 B2 | 2/2006 | Shoff et al. |
| 7,197,638 B1 | 3/2007 | Grawrock et al. |
| 7,356,662 B2 | 4/2008 | Shoff et al. |
| 7,360,073 B1 | 4/2008 | Billstrom et al. |
| 7,380,140 B1 | 5/2008 | Weissman et al. |
| 7,382,883 B2 | 6/2008 | Cross et al. |
| 7,409,623 B2 | 8/2008 | Baker et al. |
| 7,451,484 B1 | 11/2008 | Nadalin et al. |
| 7,536,536 B1 | 5/2009 | Joshi et al. |
| 7,559,088 B2 | 7/2009 | Cohen et al. |
| 7,580,950 B2 | 8/2009 | Kavuri et al. |
| 7,594,087 B2 | 9/2009 | Zeevi et al. |
| 7,646,380 B2 | 1/2010 | Tsang |
| 7,694,134 B2 | 4/2010 | Witt et al. |
| 7,711,923 B2 | 5/2010 | Rogers et al. |
| 7,725,703 B2 | 5/2010 | Hunter et al. |
| 7,757,100 B2 | 7/2010 | Weissman et al. |
| 7,849,254 B2 | 12/2010 | Ash et al. |
| 7,890,664 B1 | 2/2011 | Tao et al. |
| 7,903,549 B2 | 3/2011 | Judge et al. |
| 7,930,540 B2 | 4/2011 | Ahuja et al. |
| 7,962,739 B2 | 6/2011 | Childs et al. |
| 7,979,626 B2 | 7/2011 | Rogers |
| 8,046,365 B2 | 10/2011 | Saito |
| 8,046,533 B2 | 10/2011 | Kompella et al. |
| 8,085,933 B2 | 12/2011 | Ferguson |
| 8,214,656 B1 | 7/2012 | Plotkin et al. |
| 8,234,477 B2 | 7/2012 | Shaath |
| 8,249,257 B2 | 8/2012 | Brutch et al. |
| 8,321,688 B2 | 11/2012 | Auradkar et al. |
| 8,341,427 B2 | 12/2012 | Auradkar et al. |
| 8,341,430 B2 | 12/2012 | Ureche et al. |
| 8,387,109 B2 | 2/2013 | Ureche et al. |
| 8,411,863 B2 | 4/2013 | Ureche et al. |
| 8,416,954 B1 | 4/2013 | Raizen et al. |
| 8,417,973 B2 | 4/2013 | Cooper et al. |
| 8,423,792 B2 | 4/2013 | Luciani et al. |
| 8,458,490 B2 | 6/2013 | Konetski et al. |
| 8,527,561 B1 | 9/2013 | Moody, II et al. |
| 8,538,919 B1 | 9/2013 | Nielsen et al. |
| 8,549,271 B1 | 10/2013 | Joshi et al. |
| 8,583,879 B2 | 11/2013 | Na et al. |
| 8,588,422 B2 | 11/2013 | Beachem et al. |
| 8,625,802 B2 | 1/2014 | Parann-Nissany |
| 8,661,193 B1 | 2/2014 | Cobos et al. |
| 8,667,213 B2 | 3/2014 | Rogers et al. |
| 8,689,279 B2 | 4/2014 | Basmov et al. |
| 8,726,343 B1 | 5/2014 | Borzycki et al. |
| 8,726,407 B2 | 5/2014 | Etchegoyen |
| 8,769,305 B2 | 7/2014 | Blaisdell |
| 8,874,935 B2 | 10/2014 | Basmov et al. |
| 8,875,304 B2 | 10/2014 | Celi, Jr. et al. |
| 9,323,465 B2 * | 4/2016 | Flynn .................. G06F 3/061 |
| 9,369,289 B1 * | 6/2016 | Harrison ............... H04L 9/3268 |
| 9,430,664 B2 | 8/2016 | Adam et al. |
| 9,477,614 B2 | 10/2016 | Basmov et al. |
| 9,537,656 B2 | 1/2017 | Debout et al. |
| 9,740,639 B2 | 8/2017 | Basmov et al. |
| 2001/0000265 A1 | 4/2001 | Schreiber et al. |
| 2002/0019935 A1 | 2/2002 | Andrew et al. |
| 2003/0081784 A1 | 5/2003 | Kallahalla et al. |
| 2003/0084298 A1 | 5/2003 | Messerges et al. |
| 2003/0196114 A1 | 10/2003 | Brew et al. |
| 2003/0221095 A1 | 11/2003 | Gaunt et al. |
| 2004/0044912 A1 | 3/2004 | Connary et al. |
| 2004/0090811 A1 | 5/2004 | Kang |
| 2004/0146015 A1 | 7/2004 | Cross et al. |
| 2004/0174345 A1 | 9/2004 | Tsang |
| 2005/0071280 A1 | 3/2005 | Irwin et al. |
| 2005/0091661 A1 | 4/2005 | Kurien et al. |
| 2005/0097341 A1 | 5/2005 | Francis et al. |
| 2005/0213377 A1 | 9/2005 | Shoff et al. |
| 2005/0262361 A1 | 11/2005 | Thibadeau |
| 2005/0265074 A1 | 12/2005 | Shoff et al. |
| 2005/0283730 A1 | 12/2005 | Uyttendaele et al. |
| 2006/0101027 A1 | 5/2006 | Hotchkiss |
| 2006/0155919 A1 | 7/2006 | Lasser et al. |
| 2006/0190984 A1 | 8/2006 | Heard et al. |
| 2006/0206507 A1 | 9/2006 | Dahbour |
| 2006/0277590 A1 | 12/2006 | Limont et al. |
| 2006/0279556 A1 | 12/2006 | Tsang |
| 2007/0028231 A1 | 2/2007 | Kelso et al. |
| 2007/0058806 A1 | 3/2007 | Ferguson |
| 2007/0150886 A1 | 6/2007 | Shapiro |
| 2007/0244940 A1 | 10/2007 | Devarakonda et al. |
| 2007/0250678 A1 | 10/2007 | Ueoka et al. |
| 2007/0300008 A1 | 12/2007 | Rogers et al. |
| 2007/0300037 A1 | 12/2007 | Rogers et al. |
| 2008/0002830 A1 | 1/2008 | Cherkasov et al. |
| 2008/0005467 A1 | 1/2008 | Morley et al. |
| 2008/0010468 A1 * | 1/2008 | Ruiz ...................... G06F 21/10 |
| | | 713/189 |
| 2008/0082448 A1 | 4/2008 | Meijer et al. |
| 2008/0083036 A1 | 4/2008 | Ozzie et al. |
| 2008/0107262 A1 | 5/2008 | Helfman et al. |
| 2008/0130156 A1 | 6/2008 | Chu et al. |
| 2008/0141040 A1 | 6/2008 | Biddle et al. |
| 2008/0155316 A1 | 6/2008 | Pawar et al. |
| 2008/0168315 A1 | 7/2008 | Mead et al. |
| 2008/0229428 A1 | 9/2008 | Camiel |
| 2008/0240253 A1 | 10/2008 | Au et al. |
| 2008/0240441 A1 | 10/2008 | Kawakami |
| 2008/0263371 A1 | 10/2008 | Weissman et al. |
| 2008/0301470 A1 | 12/2008 | Green et al. |
| 2009/0024795 A1 | 1/2009 | Kobara |
| 2009/0063756 A1 | 3/2009 | Asipov |
| 2009/0075630 A1 | 3/2009 | McLean |
| 2009/0132474 A1 | 5/2009 | Ma et al. |
| 2009/0205012 A1 | 8/2009 | Jain et al. |
| 2009/0210267 A1 | 8/2009 | Fish et al. |
| 2009/0287874 A1 | 11/2009 | Rogers et al. |
| 2009/0307563 A1 | 12/2009 | Marquez et al. |
| 2010/0082898 A1 | 4/2010 | Mangold et al. |
| 2010/0100721 A1 | 4/2010 | Su et al. |
| 2010/0107213 A1 | 4/2010 | Ureche |
| 2010/0169948 A1 | 7/2010 | Budko et al. |
| 2010/0250847 A1 | 9/2010 | Chen |
| 2010/0266132 A1 | 10/2010 | Bablani et al. |
| 2010/0299152 A1 | 11/2010 | Batchu et al. |
| 2010/0306175 A1 | 12/2010 | Johnson et al. |
| 2010/0332725 A1 | 12/2010 | Post et al. |
| 2011/0010560 A1 | 1/2011 | Etchegoyen |
| 2011/0035577 A1 | 2/2011 | Lin et al. |
| 2011/0055559 A1 | 3/2011 | Li et al. |
| 2011/0055560 A1 | 3/2011 | Meissner et al. |
| 2011/0060915 A1 | 3/2011 | Tal |
| 2011/0078760 A1 | 3/2011 | De Perthuis |
| 2011/0087890 A1 | 4/2011 | Munsil et al. |
| 2011/0154023 A1 | 6/2011 | Smith et al. |
| 2011/0202916 A1 | 8/2011 | VoBa et al. |
| 2011/0225431 A1 | 9/2011 | Stufflebeam, Jr. et al. |
| 2011/0225640 A1 | 9/2011 | Ganapathy et al. |

(56) References Cited

U.S. PATENT DOCUMENTS

| | | |
|---|---|---|
| 2011/0246785 A1 | 10/2011 | Linsley et al. |
| 2011/0247047 A1 | 10/2011 | Loureiro et al. |
| 2011/0252232 A1 | 10/2011 | De Atley et al. |
| 2011/0264925 A1 | 10/2011 | Russo et al. |
| 2011/0276683 A1 | 11/2011 | Goldschlag et al. |
| 2011/0277013 A1 | 11/2011 | Chinta |
| 2012/0017095 A1 | 1/2012 | Blenkhorn et al. |
| 2012/0036347 A1 | 2/2012 | Swanson et al. |
| 2012/0036370 A1 | 2/2012 | Lim et al. |
| 2012/0079603 A1 | 3/2012 | Brown et al. |
| 2012/0087033 A1 | 4/2012 | Yang |
| 2012/0110345 A1 | 5/2012 | Pigeon et al. |
| 2012/0159148 A1 | 6/2012 | Behren et al. |
| 2012/0173882 A1 | 7/2012 | Horn et al. |
| 2012/0239618 A1 | 9/2012 | Kung |
| 2012/0297190 A1 | 11/2012 | Shen et al. |
| 2012/0331550 A1 | 12/2012 | Raj et al. |
| 2013/0013856 A1 | 1/2013 | Rogers et al. |
| 2013/0054977 A1 | 2/2013 | Basmov |
| 2013/0054979 A1 | 2/2013 | Basmov |
| 2013/0061035 A1 | 3/2013 | Hook et al. |
| 2013/0067242 A1 | 3/2013 | Lyakhovitskiy et al. |
| 2013/0074142 A1 | 3/2013 | Brennan et al. |
| 2013/0086691 A1 | 4/2013 | Fielder |
| 2013/0091543 A1 | 4/2013 | Wade et al. |
| 2013/0117561 A1 | 5/2013 | Chawla et al. |
| 2013/0117805 A1 | 5/2013 | Kent et al. |
| 2013/0124859 A1 | 5/2013 | Pestoni et al. |
| 2013/0138971 A1 | 5/2013 | Budko et al. |
| 2013/0198474 A1 | 8/2013 | Shaath |
| 2013/0208893 A1 | 8/2013 | Shablygin et al. |
| 2013/0283392 A1 | 10/2013 | Mirashrafi et al. |
| 2013/0291055 A1 | 10/2013 | Muppidi et al. |
| 2013/0318359 A1 | 11/2013 | Morris et al. |
| 2014/0007182 A1 | 1/2014 | Qureshi et al. |
| 2014/0007222 A1 | 1/2014 | Qureshi et al. |
| 2014/0019753 A1 | 1/2014 | Lowry et al. |
| 2014/0032691 A1 | 1/2014 | Barton et al. |
| 2014/0032759 A1 | 1/2014 | Barton et al. |
| 2014/0032933 A1 | 1/2014 | Smith et al. |
| 2014/0041046 A1 | 2/2014 | Vantalon et al. |
| 2014/0059690 A1 | 2/2014 | Li et al. |
| 2014/0075493 A1 | 3/2014 | Krishnan et al. |
| 2014/0081980 A1 | 3/2014 | Aad |
| 2014/0109178 A1 | 4/2014 | Barton et al. |
| 2014/0156705 A1 | 6/2014 | Beecham et al. |
| 2014/0156706 A1 | 6/2014 | Beecham et al. |
| 2014/0164774 A1 | 6/2014 | Nord et al. |
| 2014/0181512 A1 | 6/2014 | Spalka et al. |
| 2014/0230007 A1 | 8/2014 | Roth et al. |
| 2014/0259117 A1 | 9/2014 | Wachendorf et al. |
| 2014/0344570 A1* | 11/2014 | Adam ................ H04L 63/0428 713/165 |
| 2014/0344571 A1 | 11/2014 | Adam et al. |
| 2014/0359793 A1 | 12/2014 | Dobson et al. |
| 2015/0033039 A1 | 1/2015 | Basmov et al. |
| 2015/0052610 A1* | 2/2015 | Thom .................. H04L 63/145 726/24 |
| 2015/0160879 A1* | 6/2015 | Flynn ..................... G06F 3/061 711/103 |
| 2015/0186657 A1 | 7/2015 | Nakhjiri |
| 2015/0270956 A1 | 9/2015 | Basmov et al. |
| 2015/0278531 A1 | 10/2015 | Smith et al. |
| 2016/0072796 A1 | 3/2016 | Adam et al. |
| 2016/0080149 A1 | 3/2016 | Mehta et al. |
| 2016/0127327 A1 | 5/2016 | Mehta et al. |
| 2016/0154744 A1 | 6/2016 | Zheng et al. |
| 2016/0173281 A1 | 6/2016 | White et al. |
| 2016/0255079 A1* | 9/2016 | Harrison ............... H04L 9/3268 |
| 2016/0283406 A1 | 9/2016 | Linga et al. |
| 2017/0004094 A1 | 1/2017 | Basmov et al. |
| 2017/0104768 A1 | 4/2017 | Semenko et al. |

FOREIGN PATENT DOCUMENTS

| | | |
|---|---|---|
| CN | 102646077 | 8/2012 |
| CN | 103092664 | 5/2013 |
| CN | 103092938 | 5/2013 |
| CN | 103500116 | 1/2014 |
| CN | 103577567 | 2/2014 |
| EP | 2393033 | 12/2011 |
| EP | 2448303 | 5/2012 |
| EP | 2509275 | 10/2012 |
| EP | 2562675 | 2/2013 |
| EP | 2680487 | 1/2014 |
| TW | 200519595 | 6/2005 |
| TW | 200723093 | 6/2007 |
| TW | 201032559 | 9/2010 |
| TW | I540453 | 7/2016 |
| WO | WO-0049488 | 8/2000 |
| WO | WO-2004034184 | 4/2004 |
| WO | WO-2004107646 | 12/2004 |
| WO | WO-2009069043 | 6/2009 |
| WO | WO-2009149019 | 12/2009 |
| WO | WO-2012016091 | 2/2012 |
| WO | WO-2012167392 | 12/2012 |

OTHER PUBLICATIONS

"Foreign Office Action", TW Application No. 100136564, dated Oct. 20, 2015, 11 pages.

"Non-Final Office Action", U.S. Appl. No. 13/933,928, dated Oct. 21, 2015, 11 pages.

"Non-Final Office Action", U.S. Appl. No. 14/489,288, dated Nov. 6, 2015, 25 pages.

"International Search Report and Written Opinion", Application No. PCT/US2015/049981, dated Dec. 3, 2015, 11 pages.

"International Preliminary Report on Patentability", Application No. PCT/US2013/061053, dated Nov. 24, 2015, 8 pages.

Menezes,"Handbook of Applied Cryptography", CRC Press LLC,, Jan. 1, 1997, pp. 25-27 & 551-553.

"Advisory Action", U.S. Appl. No. 14/506,167, dated Apr. 13, 2016, 3 pages.

"Final Office Action", U.S. Appl. No. 14/221,105, dated Feb. 22, 2016, 35 pages.

"Foreign Notice of Allowance", TW Application No. 100136564, dated Feb. 25, 2016, 4 pages.

"International Search Report and Written Opinion", Application No. PCT/US2015/058707, dated Jan. 20, 2016, 11 Pages.

"International Search Report and Written Opinion", Application No. PCT/US2015/048750, dated Apr. 11, 2016, 22 pages.

"Second Written Opinion", Application No. PCT/US2015/021125, dated Feb. 2, 2016, 6 pages.

Chen,"Hardware-Assisted Application-Level Access Control", ISC '09 Proceedings of the 12th International Conference on Information Security, Sep. 7, 2009, 16 pages.

"About EFS (Encrypting File System)", Available at: https://www.elcomsoft.com/help/en/aefsdr/about_efs.html, Oct. 28, 2014, 3 pages.

"Application Encryption-Vormetric Data Security Products", Available at: http://www.vormetric.com/products/vormetric-application-encryption, Jun. 27, 2014, 6 pages.

"Approaches for Encryption of Data at Rest in the Enterprise", In White Papers, 2008, 24 pages.

"BitLocker Drive Encryption in Windows Vista", Microsoft TechNet, retrieved from <http://technet.microsoft.com/en-us/library/cc725719(WS.10).aspx> on Apr. 25, 2011, Aug. 6, 2010, 9 pages.

"CheckVision Enterprise Encryption", Available at: http://assets1.csc.com/banking/downloads/CardsPayments_CheckVisionEnterprise_DS.pdf, Apr. 24, 2013, 2 pages.

"DataStax Enterprise 3.2", Available at: http://docs.datastax.com/en/datastax_enterprise/3.2/datastax_enterprise/sec/secTDE.html—Retrieved on: Jul. 23, 2015, 2 pages.

"Extended European Search Report", EP Application No. 11871440.1, dated Mar. 16, 2015, 5 pages.

(56) References Cited

OTHER PUBLICATIONS

"Extended European Search Report", EP Application No. 11871825.3, dated May 11, 2015, 7 pages.
"Final Office Action", U.S. Appl. No. 13/221,629, dated Dec. 23, 2013, 24 pages.
"Foreign Notice of Allowance", CN Application No. 201210314631.1, dated Aug. 20, 2015, 4 pages.
"Foreign Notice of Allowance", CN Application No. 201210314748.X, dated Jul. 3, 2015, 3 pages.
"Foreign Office Action", CN Application No. 201210314631.1, dated Dec. 1, 2014, 14 pages.
"Foreign Office Action", CN Application No. 201210314748.X, dated Mar. 17, 2015, 7 pages.
"Foreign Office Action", CN Application No. 201210314748.X, dated Sep. 23, 2014, 14 Pages.
"International Search Report and Written Opinion", Application No. PCT/US2015/021125, dated Jul. 3, 2015, 9 Pages.
"International Search Report and Written Opinion", Application No. PCT/US2011/055600, dated Jul. 30, 2012, 9 pages.
"International Search Report and Written Opinion", Application No. PCT/US2011/055626, dated Sep. 19, 2012, 9 pages.
"Non-Final Office Action", U.S. Appl. No. 13/221,629, dated May 17, 2013, 27 pages.
"Non-Final Office Action", U.S. Appl. No. 13/221,699, dated Apr. 1, 2013, 16 pages.
"Non-Final Office Action", U.S. Appl. No. 13/898,368, dated Aug. 4, 2015, 17 pages.
"Non-Final Office Action", U.S. Appl. No. 14/221,105, dated Aug. 4, 2015, 25 pages.
"Non-Final Office Action", U.S. Appl. No. 14/506,167, dated Jun. 29, 2015, 16 pages.
"Notice of Allowance", U.S. Appl. No. 13/221,629, dated Jun. 27, 2014, 16 pages.
"Notice of Allowance", U.S. Appl. No. 13/221,699, dated Oct. 30, 2013, 9 pages.
"Oracle Advanced Security", Available at: http://www.oracle.com/technetwork/database/security/ds-advanced-security-tde-psft-129631.pdf, Apr. 16, 2011, 2 pages.
"Search Report", TW Application No. 100136565, dated Aug. 3, 2015, 1 pages.
"Security Solutions and Services", retrieved from <http://www.csc.com/public_sector/offerings/11043/17449-security_solutions_and_services> on Apr. 25, 2011, 2 pages.
"Transparent Data Encryption (TDE)", Available at: https://msdn.microsoft.com/en- in/library/bb934049.aspx—Retrieved on: Jul. 23, 2015, 11 pages.
"Unlock BitLocker under Windows PC", Retrieved from: <http://windows7migration.info/index.php option=com_content&view=article&id=1836:unlock-bitlocker-under-windows-pe&catid=42:4sysops&Itemid=61> on Aug. 4, 2011, 5 pages.
Adam,"Enterprise Data Protection: Building Universal Windows Apps That Keep Work and Personal Data Separate and Secure", Available at: https://mix.office.com/watch/fd0jojbqv6qx—Retrieved on: Jul. 23, 2015, 20 pages.
Kalogeropoulos,"Oracle Data Pump Encrypted Dump File Support", In Oracle White Paper, Jul. 2011, 15 pages.
Lane,"Cracking the Confusion: Encryption Layers", Available at: https://securosis.com/blog/cracking-the-confusion-encryption-layers, Feb. 12, 2015, 2 pages.
Lawson,"Meeting Regulatory Compliance Challenges with Data Management Tools Solutions", YL & A, www.ylassoc.com, available at <ftp://public.dhe.ibm.com/software/data/db2imstools/solutions/lawson-reg-compliance.pdf>, Sep. 19, 2006, pp. 1-18.
Li,"Managing Data Retention Policies at Scale", IFIP/IEEE International Symposium on Integrated Network Management 2011, Dublin, Ireland, May 23-27, 2011., available at <http://www.hpl.hp.com/techreports/2010/HPL-2010-203.pdf>, Dec. 21, 2010, 9 pages.

Magnabosco, "Transparent Data Encryption", Available at: https://www.simple-talk.com/sql/database-administration/transparent-data-encryption/, Mar. 16, 2010, 19 pages.
Mont,"A Systemic Approach to Privacy Enforcement and Policy Compliance Checking in Enterprises", Trusted Systems Laboratory, HP Laboratories Bristol, HPL-2006-44, available at <http://www.hpl.hp.com/techreports/2006/HPL-2006-44.pdf>, Mar. 16, 2006, 11 pages.
Toegl, "acTvSM: A Dynamic Virtualization Platform for Enforcement of Application Integrity", Lecture Notes in Computer Science vol. 6802, 2011, Retrieved from <https://online.tugraz.at/tug_online/voe_main2.getvolltext?pCurrPk=60165>, 2011, 20 pages.
Wahl,"Oracle Advanced Security Transparent Data Encryption Best Practices", In Oracle White Paper, Jul. 2012, 29 pages.
"Corrected Notice of Allowance", U.S. Appl. No. 14/506,167, dated Sep. 7, 2016, 2 pages.
"Examiner's Answer to Appeal Brief", U.S. Appl. No. 13/898,368, dated Sep. 8, 2016, 7 pages.
"Foreign Office Action", TW Application No. 105101128, dated Aug. 23, 2016, 5 pages.
"Non-Final Office Action", U.S. Appl. No. 14/481,672, dated Jul. 28, 2016, 12 pages.
"Notice of Allowance", U.S. Appl. No. 14/506,167, dated Jun. 22, 2016, 11 pages.
"Restriction Requirement", U.S. Appl. No. 14/481,672, dated Jun. 28, 2016, 6 pages.
"Second Written Opinion", Application No. PCT/US2015/049981, dated Jul. 26, 2016, 5 pages.
"Adobe AIR 1.5 Applications with Flex—Storing Encrypted Data", Retrieved From: <http://help.adobe.com/en_US/AIR/1.5/devappsflex/WS5b3ccc516d4fbf351e63e3d118666ade46-7e31.html> May 1, 2015, Oct. 19, 2012, 2 pages.
"Blackberry 10", Retrieved from <http://en.wikipedia.org/wiki/BlackBerry_10#BlackBerry_Balance> on Apr. 2, 2013, Apr. 1, 2013, 8 pages.
"Divide: The Next Generation of Enterprise Mobility", Retrieved at <<http://www.divide.com/download/Divide_Product_Sheet_1116.pdf<< on May 8, 2013, Jan. 20, 2013, 2 pages.
"Exchange ActiveSync", Retrieved from <http://en.wikipedia.org/wiki/Exchange_ActiveSync> on Apr. 1, 2013, Apr. 1, 2013, 5 pages.
"Exchange ActiveSync: Provisioning Protocol", Retrieved from <http://msdn.microsoft.com/en-us/library/dd299443(v=EXCHG.80).aspx> on Apr. 1, 2013, Dec. 3, 2008, 4 Pages.
"Final Office Action", U.S. Appl. No. 13/898,368, dated Apr. 16, 2015, 16 pages.
"How Can We Ensure Data Security on Mobile Devices??", Retrieved From: <http://enterprise.huawei.com/topic/byod_en/solution_byod_info_3.html> Mar. 6, 2014, Jun. 16, 2013, 4 Pages.
"How Do I Prevent 'Sensitive Data Exposure'?", Retrieved From: <https://www.owasp.org/index.php/Top_10_2013-A6-Sensitive_Data_Exposure> May 12, 2015, Jun. 23, 2013, 2 pages.
"InnoSetup Help", Retrieved From: <http://www.jrsoftware.org/ishelp/index.php?topic=filessection> May 12, 2015, 8 pages.
"International Search Report and Written Opinion", Application No. PCT/US2013/061053, dated Jan. 30, 2014, 10 Pages.
"Mobile Device Management", Retrieved from <http://www.bing.com/search?q=mobile+device+management&src=IE-TopResult&FORM=IE10TR> on Apr. 2, 2013, 2013, 2 pages.
"MobileIron Introduces the First Complete Mobile App Persona for the Enterprise", Retrieved from <http://www.mobileiron.com/en/company/press-room/press-releases/371-mobileiron-introduces-the-first-complete-mobile-app-persona-for-the-enterprise> on Mar. 25, 2013, Nov. 6, 2012, 2 pages.
"Non-Final Office Action", U.S. Appl. No. 13/898,368, dated Dec. 8, 2014, 12 pages.
"OMA Device Management", Retrieved from <http://en.wikipedia.org/wiki/OMA_DM> on Apr. 2, 2013, Mar. 25, 2013, 4 Pages.
"OMA Device Management", Retrieved from <http://msdn.microsoft.com/en-us/library/bb737369.aspx>, Aug. 4, 2010, 4 Pages.

(56) References Cited

OTHER PUBLICATIONS

"Securing end-user mobile devices in the enterprise", In Proceedings: Thought Leadership White Paper, IBM Global Technology Services, Apr. 2011, 6 Pages.

"ThoriumCloud Enterprise Container", Retrieved from <http://www.thoriumcloud.com/> on Mar. 25, 2013, 2013, 4 Pages.

"Various Mobile Device Management (MDM) Solutions", Retrieved From: <http://www.bing.com/search?q=mobile+device+management&src=IE-TopResult&FORM=IE10TR> Mar. 5, 2014, 2 Pages.

"What Android Sync'd Data is Encrypted?", Retrieved From: <http://android.stackexchange.com/questions/3129/what-android-syncd-data-is-encrypted>, Nov. 25, 2010, 3 pages.

"Windows Selective Wipe for Device Data Management", Retrieved from <http://technet.microsoft.com/en-us/library/dn486874.aspx>, Nov. 1, 2013, 4 pages.

Becher,"Mobile Security Catching Up? Revealing the Nuts and Bolts of the Security of Mobile Devices", Proceedings of IEEE Symposium on Security and Privacy, May 22, 2011, pp. 96-111.

Bugiel,"Practical and Lightweight Domain Isolation on Android", Proceedings of the 1st ACM Workshop on Security and privacy in Smartphones and Mobile Devices, Oct. 17, 2011, 12 pages.

Gudeth,"Delivering Secure Applications on Commercial Mobile Devices: The Case for Bare Metal Hypervisors", Proceedings of the 1st ACM Workshop on Security and privacy in Smartphones and Mobile Devices, Oct. 17, 2011, pp. 33-38.

Li,"Scalable and Secure Sharing of Personal Health Records in Cloud Computing Using Attribute-Based Encryption", IEEE Transactions on Parallel and Distributed Systems, vol. 24, Issue 1, Jan. 2013, pp. 131-143.

Mitchell,"What is a Selective Wipe?", Retrieved from <http://www.landesk.com/blog/what-is-a-selective-wipe/> on Mar. 25, 2013, Apr. 30, 2012, 1 page.

Oberheide,"When Mobile is Harder Than Fixed (and Vice Versa): Demystifying Security Challenges in Mobile Environments", Proceedings of Eleventh International Workshop on Mobile Computing Systems and Applications, Feb. 22, 2010, 6 pages.

Pecherle,"Data Wiping System with Fully Automated, Hidden and Remote Destruction Capabilities", In Journal of WSEAS Transactions on Computers, vol. 9, Issue 9, Available at <http://www.wseas.us/e-library/transactions/computers/2010/88-110.pdf>, Sep. 2010, pp. 939-948.

Pisko,"Trusted Computing in Mobile Platforms—Players, Usage Scenarios, and Interests", Proceedings of Privacy and Security, Sep. 2005, pp. 526-530.

Purdy,"Thumb Drive", Retrieved From: <http://lifehacker.com/5583307/top-10-usb-thumb-drive-tricks-2010-edition> May 12, 2015, Oct. 7, 2010, 6 pages.

Reardon,"Secure Deletion on Log-structured File Systems", In Proceedings: Technical Report, Department of Computer Science, ETH Zurich Available at: <http://arxiv.org/pdf/1106.0917.pdf>, Jun. 5, 2011, 11 pages.

Stehle,"Provisioning, Policies, Remote Wipe, and the Allow/Block/Quarantine list in Exchange ActiveSync", Retrieved from <http://msdn.microsoft.com/en-us/library/exchange/hh509085(v=exchg.140).aspx> on Apr. 1, 2013, 2013, 20 pages.

Stockton,"Divide and your Data: Privacy, Sync, Backup, Restore, Storage and Wipe", Retrieved from <http://support.divide.com/entries/20964987-Divide-and-your-data-privacy-sync-backup-restore-storage-and-wipe> on Mar. 25, 2013, Feb. 8, 2012, 2 pages.

Zeis,"The security of BlackBerry Balance", Retrieved From: <http://crackberry.com/security-blackberry-balance> Mar. 6, 2014, Aug. 2, 2013, 13 pages.

"Final Office Action", U.S. Appl. No. 14/489,288, dated Jun. 15, 2016, 25 pages.

"Foreign Notice of Allowance", TW Application No. 100136565, dated Mar. 25, 2016, 4 pages.

"International Preliminary Report on Patentability", Application No. PCT/US2015/021125, dated May 11, 2016, 7 pages.

"Non-Final Office Action", U.S. Appl. No. 14/533,921, dated Apr. 19, 2016, 18 pages.

"Notice of Allowance", U.S. Appl. No. 13/933,928, dated Apr. 22, 2016, 8 pages.

"Batch File Encrypt—Encrypt and decrypt whole files or their parts using symmetric algorithms", Retrieved at: https://web.archive.org/web/20131217055640/http://www.binarymark.com/products/batchfileencrypt/default.aspx—on Dec. 15, 2016, Dec. 17, 2013, 21 pages.

"Corrected Notice of Allowance", U.S. Appl. No. 14/506,167, dated Sep. 27, 2016, 2 pages.

"File locking—Wikipedia", Retrieved at: https://en.wikipedia.org/w/index.php?title=File_locking&oldid=679856482—on Dec. 15, 2016, 5 pages.

"International Preliminary Report on Patentability", Application No. PCT/US2015/048750, dated Dec. 6, 2016, 11 pages.

"International Preliminary Report on Patentability", Application No. PCT/US2015/049981, dated Oct. 18, 2016, 6 pages.

"International Preliminary Report on Patentability", Application No. PCT/US2015/058707, dated Oct. 27, 2016, 7 pages.

"International Search Report and Written Opinion", Application No. PCT/US2016/039468, dated Sep. 1, 2016, 10 pages.

"International Search Report and Written Opinion", Application No. PCT/US2016/054036, dated Dec. 1, 2016, 12 pages.

"Non-Final Office Action", U.S. Appl. No. 15/266,591, dated Oct. 12, 2016, 10 pages.

"Second Written Opinion", Application No. PCT/US2015/048750, dated Aug. 8, 2016, 9 pages.

"Second Written Opinion", Application No. PCT/US2016/039468, dated Dec. 1, 2016, 5 pages.

"Final Office Action", U.S. Appl. No. 14/481,672, dated Feb. 9, 2017, 16 pages.

"Final Office Action", U.S. Appl. No. 14/506,167, dated Nov. 23, 2015, 19 pages.

"Final Office Action", U.S. Appl. No. 14/533,921, dated Feb. 24, 2017, 15 pages.

"Foreign Notice of Allowance", TW Application No. 110501128, dated Dec. 29, 2016, 4 pages.

"Non-Final Office Action", U.S. Appl. No. 14/221,105, dated Feb. 24, 2017, 42 pages.

"Non-Final Office Action", U.S. Appl. No. 14/489,288, dated Jan. 19, 2017, 30 pages.

Kher,"Securing Distributed Storage: Challenges, Techniques, and Systems", ACM Workshop on Storage security and survivability, 2005, p. 9-25.

Sharma,"TransCrypt: Design of a Secure and Transparent Encrypting File System", Master's Thesis, Indian Institute of Technology Kanpur, Aug. 2006, 50 pages.

"Corrected Notice of Allowance", U.S. Appl. No. 15/266,591, dated Jul. 5, 2017, 2 pages.

"Corrected Notice of Allowance", U.S. Appl. No. 15/266,591, dated Jul. 19, 2017, 2 pages.

"Final Office Action", U.S. Appl. No. 14/221,105, dated Aug. 23, 2017, 41 pages.

"Foreign Office Action", CN Application No. 201380076761.9, dated May 31, 2017, 17 pages.

"Notice of Allowance", U.S. Appl. No. 14/481,672, dated Jul. 27, 2017, 7 pages.

"Notice of Allowance", U.S. Appl. No. 14/489,288, dated Aug. 25, 2017, 8 pages.

"Second Written Opinion", Application No. PCT/US2016/054036, dated Aug. 8, 2017, 6 pages.

"Notice of Allowance", U.S. Appl. No. 15/266,591, dated May 11, 2017, 11 pages.

"Non-Final Office Action", U.S. Appl. No. 14/879,938, dated Mar. 24, 2017, 16 pages.

"Final Office Action", U.S. Appl. No. 14/879,938, Sep. 7, 2017, 16 pages.

"International Preliminary Report on Patentability", Application No. PCT/US2016/039468, Oct. 9, 2017, 7 pages.

"Notice of Allowance", U.S. Appl. No. 14/533,921, Oct. 5, 2017, 9 pages.

(56) References Cited

OTHER PUBLICATIONS

"PTAB Decision", U.S. Appl. No. 13/898,368, Oct. 18, 2017, 6 pages.
"Supplemental Notice of Allowance", U.S. Appl. No. 14/489,288, Sep. 8, 2017, 2 pages.

\* cited by examiner

INTELLIGENT DELETION OF REVOKED DATA

BACKGROUND

As computing technology has advanced, many different types of computing devices have become commonplace. Portable computing devices have become increasingly popular, with users sometimes bringing their personal computing devices to the workplace and using their personal computing devices for work. Such use can result in situations in which data files for work are stored on the user's personal computing device. While this can be helpful for users, it is not without its problems. One such problem is that companies typically want to maintain some control over their data because it oftentimes includes confidential information. This control, however, can conflict with the desired use and full enjoyment of the computing device by the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a determination is made whether access to first organization data on a computing device has been revoked, the first organization data comprising data that is associated with an organization. In response to the access being revoked and based at least on a nature of the first organization data, second organization data on the computing device is selected, the second organization data comprising a subset of the first organization data, and the second organization data is deleted from the computing device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Intelligent deletion of revoked data is discussed herein. A program on a computing device can communicate with services of an organization, such as email services, file services, and so forth, and can obtain organization data. Organization data refers to data that is associated with an organization (e.g., a company, partnership, educational entity, governmental entity, etc.) and that is managed or controlled by the organization. This management or control can include restrictions regarding how the data is stored on the computing device, how the data is used on the computing device, particular security settings or programs the computing device is to have, and so forth. The organization data is optionally encrypted using one or more encryption keys, and the program has access to one or more decryption keys allowing the organization data to be decrypted and used at the computing device. Additionally or alternatively, the organization data may be tagged or otherwise identified as organization data and need not be encrypted.

Situations can arise in which the organization data stored on the computing device is to no longer be accessible to a user and/or the device, which is also referred to as the data being revoked. The data can be revoked for the user and/or the device. Such situations can arise for various reasons, such as a user of the device no longer working for the organization, changes in policy, changes in access privileges due to movement of the user within the organization, the device being lost or stolen, and so forth. In such situations, the revocation is enforced by disabling or disallowing access to the organization data, such as by maintaining a list or other record of organization data that is not accessible, by deleting the one or more decryption keys used to decrypt the organization data making the organization data unreadable or inaccessible, and so forth.

In response to organization data being revoked for the user and/or device, the techniques discussed herein are used to intelligently delete the data. Intelligently deleting the data refers to determining, based on the revocation that occurred and the nature of the data on the device, which data on the device is to be deleted from the device. The nature of the data on the device may, for example, take into account various different factors and/or characteristics of the data on the device, such as which data on the device is organization data, which data on the device is metadata related to organization data, which data on the device is not to be deleted despite being organization data (e.g., due to another user of the device having access rights to the data that have not been revoked), and so forth.

The intelligent deletion of revoked data discussed herein provides numerous different effects. One such effect is a reduction in storage device space being used. Storage device space is at a premium in many devices, particularly lower cost or smaller devices. By deleting data on the device that is no longer readable by programs on the device, storage space is conserved and can be used for other programs or data that can be read by programs on the device. This can be particularly useful if the device is recycled for a different purpose (e.g., a device previously used for work is now used for personal use). Another such effect is reduced memory footprint. In some situations, copies or derivatives of the organization data (whether plaintext or encrypted) may be held by another component (e.g., an indexing component) that keeps items in memory. By deleting such copies or derivatives, the memory usage on the device is reduced. Another such effect is increased energy savings due to a smaller amount of data to be managed. In some situations, files or other data that is no longer readable by programs on the device might still be accessed and is accounted for by various different device management or utility programs on the device. By reducing the amount of data that is accessed and accounted for by such device management or utility programs, the amount of time such programs run and consume energy is reduced.

Figure 1:
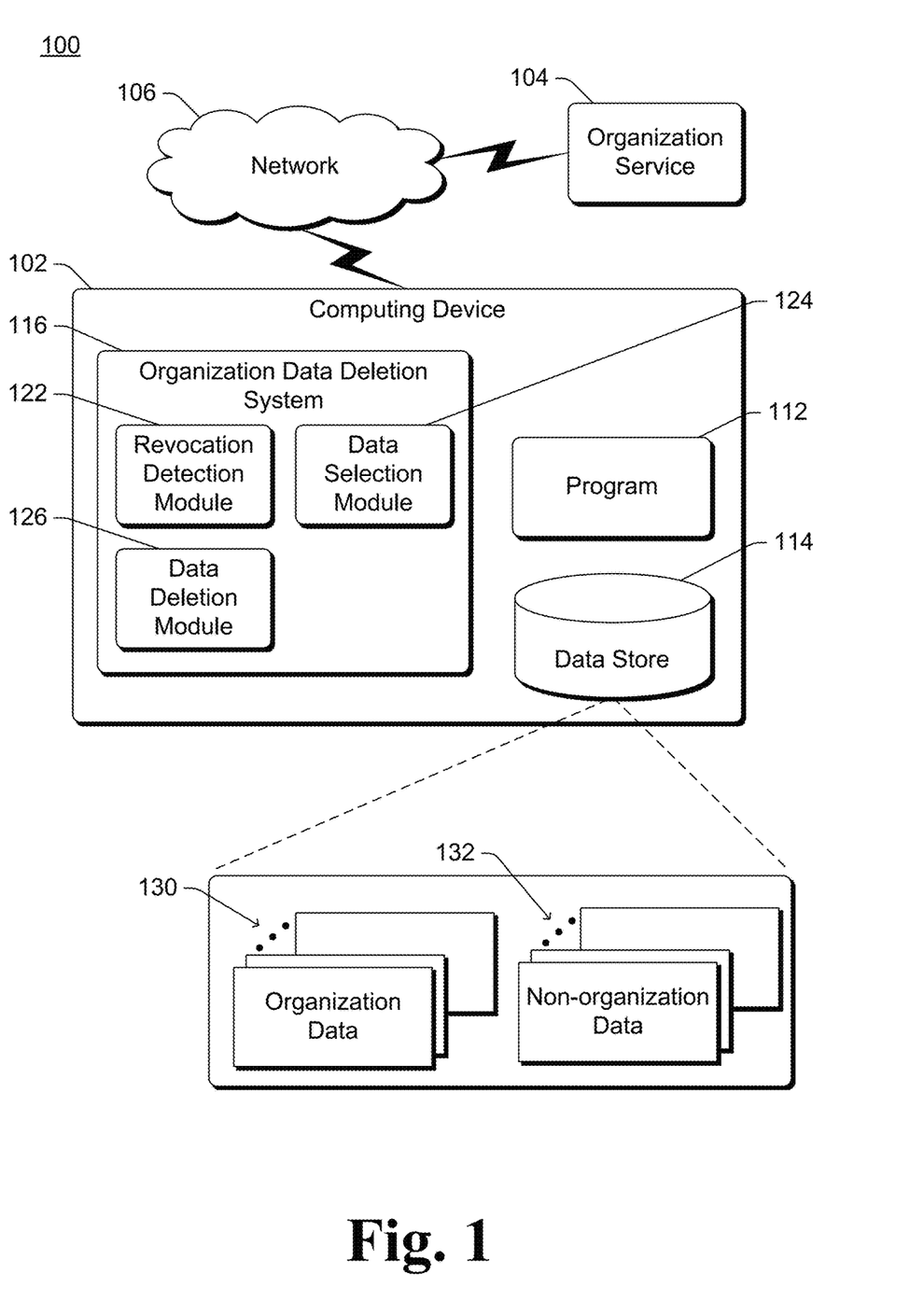
FIG. 1 illustrates an example system implementing the intelligent deletion of revoked data in accordance with one or more embodiments.

FIG. 1 illustrates an example system 100 implementing the intelligent deletion of revoked data in accordance with one or more embodiments. System 100 includes a computing device 102 that can communicate with an organization service 104 via a network 106. The network 106 can be a variety of different networks, including the Internet, a local area network (LAN), a phone network, an intranet, other public and/or proprietary networks, combinations thereof, and so forth.

The computing device 102 can be a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, the computing device 102 may range from a full resource device with substantial memory and processor resources (e.g., personal computers, game consoles) to a low-resource device with limited memory and/or processing resources (e.g., traditional set-top boxes, hand-held game consoles).

The organization service 104 can be implemented by one or more of a variety of different computing devices capable of providing data to the computing device 102. Similar to the discussion of the computing device 102, each computing device implementing at least part of the organization service 104 can be a variety of different devices, ranging from full resource devices with substantial memory and processor resources to low-resource devices with limited memory and/or processing resources.

The organization service 104 can be a service provided by various different types of organizations, such as businesses, academic institutions, non-profit entities, and so forth. Various different types of services can be provided by an organization, such as email services, text or other messaging services, file storage or synchronization services, document authoring or management services, and so forth. The organization provides or otherwise makes available, via the organization service 104, data to the computing device 102. This data is referred to as data associated with the organization, organization data, organization content, and so forth.

The organization service 104 is discussed as being accessed via the network 106. Alternatively, the organization service 104 can be implemented at least in part by the computing device 102. For example, the organization service 104 can be a Mobile Device Management (MDM) or Mobile Application Management (MAM) client implemented on the computing device 102. The MDM or MAM client can be configured to issue a command to revoke the data associated with an organization when a management relationship ends. This revocation of data is discussed in more detail below.

The computing device 102 includes an application or program 112, a data store 114, and an organization data deletion system 116. The organization data deletion system 116 can be implemented as part of a file system of the computing device 102, or alternatively as another application or program running on the computing device 102. The program 112 may communicate with the organization service 104 to obtain and/or update organization data, and/or may generate organization data itself. The program 112 can be, for example, an email application, a word processor application, a file synchronization application, a Web platform or Web application, and so forth.

The organization data deletion system 116 manages deletion of organization data that has been revoked at the computing device 102. As used herein, the organization data includes any information associated with an organization, such as user-entered data or program data, program instructions, binary code, and so forth. In one or more embodiments, organization data is protected by being encrypted so that it is computationally very difficult to decrypt the data without a decryption key that is related to the organization, and by allowing the decryption key to be deleted. Additionally or alternatively, organization data is protected and access revoked via access control features of the operating system, firmware, and/or device hardware. Organization data can be associated with one or more users of the computing device 102 and protected by being tagged to the organization for access control purposes and/or encrypted (by the program 112, a file system of computing device 102, by an operating system of the computing device 102, and so forth) using a key associated with the one or more users. Access to the data can be revoked for the one or more users by deleting the decryption key or keys associated with the one or more users, by modifying an access control list for the data to remove one or more of the users, and so forth. In situations in which one or more decryption keys are used, users and decryption keys can have a one to many relationship (one user may have multiple organization-related keys), a many to one relationship (there could be different keys for different users) or a many to many relationship (the same key may be used by multiple users but stored per user in storage that is tied to and only accessible to the individual user, such as as part of an operating system user profile for the individual user). Additionally or alternatively, organization data can be associated with the computing device 102 and protected by being tagged to the organization for access control purposes and/or encrypted (by the program 112, a file system of computing device 102, by an operating system of the computing device 102, and so forth) using a key associated with the computing device 102. Access to the data can be revoked for all users of the computing device 102 by deleting the decryption key associated with the computing device 102, by modifying an access control list, and so forth.

The organization data deletion system 116 includes a revocation detection module 122, a data selection module 124, and a data deletion module 126. Generally, the revocation detection module 122 detects when organization data on the computing device 102 has been revoked, and communicates an indication of the revocation to the data selection module 124. The data selection module 124 selects or determines which organization data on the computing device 102 is to be deleted based on the nature of the data and the revocation that was detected by the revocation detection module 122. The data selection module 124 communicates an indication of the selected or determined organization data to the data deletion module 126, which deletes the selected or determined data from the data store 114.

The data store 114 includes one or more data storage devices for the computing device 102, such as Flash memory disks, magnetic disks, optical discs, random access memory (RAM), combinations thereof, and so forth. The data storage devices can be fixed or removable devices, and can be included as part of the computing device 102 or coupled to the computing device 102. The storage device 114 is illustrated as including organization data 130 as well as non-organization data 132. The organization data 130 optionally includes both encrypted organization data as well as non-encrypted organization data, or alternatively includes just encrypted organization data or just non-encrypted organization data.

The organization data deletion system 116 manages deletion of organization data. When revoking access to data, the one or more encryption keys used to decrypt the data are deleted or otherwise made unavailable at the computing device 102. Additionally or alternatively, one or more organization metadata tags are denoted as revoked, and the access control system (whether in the operating system, firmware, hardware or otherwise) applies access restriction based on revocation. The organization data deletion system 116 follows up on the revocation by deleting the organization data itself on the computing device 102, thereby freeing up space in data store 114.

The revocation detection module 122 detects when organization data on the computing device 102 has been revoked, and communicates an indication of the revocation to the data selection module 124. The revocation detection module 122 can detect that organization data has been revoked based on an indication from the organization service 104 or alternatively from a local module or component of the computing device 102. The indication or detection that organization data on the computing device 102 has been revoked is also referred to as a revocation event.

The revocation detection module 122 can detect that organization data has been revoked in a variety of different manners. In one or more embodiments, the revocation detection module 102 enrolls, registers, or is otherwise configured to receive notifications of revocation events. The organization service 104 communicates a notification of a revocation event, which is received by the revocation detection module 102. Additionally or alternatively, the revocation detection module 122 can poll the organization service 104 at regular or irregular intervals, querying the organization service 104 as to whether organization data for the computing device 102 and/or a user of the computing device 102 has been revoked. Additionally or alternatively, the revocation detection module 122 can, in response to being unable to decrypt or access particular organization data, query the organization service 104 to determine whether the organization data has been revoked.

The data selection module 124 selects (also referred to as identifies or determines) which organization data on the computing device 102 is to be deleted based on the nature of the data and the revocation that was detected by the revocation detection module 122. This selection can be triggered by the detection of the revocation of organization data by the revocation detection module 122, and/or the selection can be performed at a later time. For example, a record of the revocation event (e.g., a particular data value or other indication) can be maintained (e.g., cached) by the revocation detection module 122 or the data selection module 124, and in response to a removable storage device (e.g., a thumb drive, a portable hard drive, etc.) being inserted or otherwise connected to the computing device 102, the selection can be triggered for data stored on that removable storage device.

The data selection module 124 selects which organization data on the computing device 102 is to be deleted by identifying which data stored on the computing device is organization data, and for that identified organization data determining whether the organization data is to be deleted. A variety of different factors based on the revocation event and the nature of the organization data can be used to determine whether the organization data is to be deleted, as discussed in more detail below.

The organization data can take a variety of different forms. In one or more embodiments, the organization data is a file. Additionally or alternatively, the organization data can take other forms, such as a folder or directory, a file container (e.g., storing compressed files), a logical binary object, a database entry, thumbnails, credentials associated with accessing an endpoint (e.g., passwords, private or secret keys, cookies that contain tokens used to access the server, etc.), data referencing other organization data (e.g., a shortcut or other index to a file or other organization data), metadata for the organization data, and so forth. In the case of a folder or directory, an attribute of the folder or directory can be set to indicate that any data subsequently stored in that folder or directory (and/or already stored in that folder or directory) is also organization data.

Data deletion module 126 deletes the organization data selected by the data selection module 124. This deletion of the data frees up storage space in the data store 114, allowing other data for the program 112 (and/or other programs) to be stored on the data store, allowing additional programs to be installed on the computing device 102, and so forth. The manner in which the data is deleted can vary based on the type of data. For example, data deletion module 126 can delete files (e.g., remove references to the files from a file system of the computing device 102 and release portions of the data store 114 that are used to store the files), can delete database entries (e.g., remove references to the database entries from an index or other database record, and release portions of the data store 114 that are used to store the database entries), and so forth.

Which data on the computing device 102 is organization data can be determined in a variety of different manners. In one or more embodiments, organization data that is stored on the computing device 102 is tagged as organization data. This tagging can occur prior to storing of the data (e.g., having a tag value added to the organization data prior to receipt of the organization data at the computing device 102), when the data is saved on the computing device 102, or after the data is saved on the computing device 102 (e.g., if the data becomes organization data after the data is saved on the computing device 102). This tagging can also occur when the data is created (e.g., a database entry that is metadata derived from organization data can be tagged as organization data at the time of creation of the database entry), by a user creating data explicitly taking an action to mark the data as organization data, when saving organization data (e.g., through operating system file management tools), and so forth.

This tagging of data as organization data can be performed in a variety of different manners. In one or more embodiments, a table, database, or other record is maintained that identifies the organization data on the computing device 102. Additionally or alternatively, an indication that the data is organization data may be embedded in the data itself (e.g., as part of a header portion of the data or in an alternate stream). Organization data for multiple different organizations can optionally be stored on the computing device 102 (e.g., due to the computing device 102 being managed by multiple different organizations), in which case the organization data associated with each organization is tagged with an indication of that organization, allowing the organization data for a particular one organization to be identified. Thus, if data for organization A is revoked but data for organization B is not revoked, then the data selection module 124 can select organization data for organization A for deletion without selecting organization data for organization B for deletion.

In one or more embodiments, the computing device 102 can have multiple users and different organization data can be associated with one or more of those multiple users. In this situation, the organization data is tagged with an indication of the user that is associated with (allowed to decrypt and/or access) that organization data, allowing the organization data associated with a particular one user to be identified. Organization data for a particular user can thus be revoked without revoking the organization data for other users. For example, if organization data associated with a user A is revoked but organization data associated with a user B is not revoked, then the data selection module 124 can select organization data associated with user A for deletion without selecting organization data associated with user B for deletion.

Which data on the computing device 102 is organization data can additionally or alternatively be determined in other manners. In one or more embodiments, some data can be associated with user credentials (e.g., user name or other identifier of the user). This association can be maintained in a variety of different manners, such as using list or other record, by virtue of the location in the data store 114 where the data is stored, using metadata explicitly tied to the data in a header or alternate stream, and so forth. An indication of a revocation event can include an identification of particular user credentials that are being revoked, and any data associated with those revoked user credentials is also considered to be organization data. Additionally or alternatively, user credentials may have an expiration date and/or time, or be otherwise invalid due to a particular action or event occurring. This expiration or invalidation of user credentials can be automatically detected by the revocation detection module 122, and the data associated with such expired or otherwise invalidated user credentials is also considered to be organization data.

The techniques discussed herein allow the data selection module 124 to make an intelligent decision regarding which data is to be selected for deletion from the computing device 102, resulting in a large amount of the data (e.g., all, or at least 90-95% of the data) that can no longer be decrypted and/or accessed on the computing device due to the revocation of the data being deleted, but also resulting in not deleting data that may still be decrypted at the computing device even though the data has been revoked for a particular user. In one or more embodiments, the data selection module 124 selects all organization data as the data to be deleted, unless one or more factors indicate that the data is not to be deleted.

In one or more embodiments, the data selection module 124 determines whether there is at least one valid credential associated with the organization data. A valid credential corresponds to or denotes a user of the computing device that is authorized to access (is associated with) the data and/or an organization that manages (is associated with) the data. The data selection module 124 determines that organization data is not to be deleted, and thus does not select such data for deletion, in response to at least one valid credential still being associated with the data. Organization data having at least one associated valid credential is excluded from the subset of organization data that is deleted from the computing device. Thus, in response to a revocation event for an organization, some of the organization data associated with the organization can be deleted while other of the organization data associated with the organization is not deleted.

For example, particular organization data on the computing device 102 may be associated with multiple users, and the particular organization data may be revoked for one of the multiple users but not the other. In this situation, the data selection module 124 does not select the particular organization data for deletion because at least one of the multiple users is still associated with the particular organization data. However, if the particular organization data were revoked for each of the multiple users, then data selection module 124 does select the particular organization data for deletion because there is no user of the computing device 102 that can decrypt or access the particular organization data.

By way of another example, particular organization data on the computing device 102 may be associated with multiple organizations, and the particular organization data may be revoked for one of the multiple organizations but not the other. In this situation, the data selection module 124 does not select the particular organization data for deletion because at least one of the multiple organizations is still associated with the particular organization data. However, if the particular organization data were revoked for each of the multiple organizations, then data selection module 124 does select the particular organization data for deletion because there no user of the computing device 102 that can decrypt or access the particular organization data.

In one or more embodiments, data is prioritized so that certain organization data is deleted prior to other organization data. This prioritization can be based on a variety of different criteria, such as having organization data that is deemed sensitive or at-risk deleted prior to organization data that is deemed to be less sensitive or less at-risk. Data can be deemed sensitive or at-risk based on various criteria, such as the data not being encrypted (for example, organization data may include an index of encrypted content and that index may not be encrypted), the data being encrypted using a less secure encryption key or encryption technique than used for other organization data, the data having been flagged or otherwise identified (e.g., by the program 112 or the organization service 104) as being sensitive or a high priority, and so forth. Additionally or alternatively, data can be prioritized based on other criteria, such as file type (e.g., certain file types such as documents can be deleted prior to other file types), data size (e.g., data that is larger (e.g., having a larger number of bytes) can be deleted prior to data that is smaller (e.g., having a smaller number of bytes)). Additionally or alternatively, data can be prioritized based on actual content, such as by using an indexer to prioritize data related to a particular topic or set of topics (e.g., merger and acquisition information) to be deleted prior to data not related to the particular topic or set of topics.

The prioritization of the data is performed by the data selection module 124, or alternatively by the data deletion module 126. Regardless of the module that performs the prioritization of the data, the data deletion module 126 deletes the organization data from the computing device 102 in its order of prioritization. For example, organization data that is prioritized higher (e.g., sensitive or at-risk data, document files, large files) is deleted by the data deletion module 126 before organization data that is prioritized lower (e.g., less sensitive or less at-risk data) is deleted.

In one or more embodiments, the organization data deletion system 116 interacts with the program 112, notifying the program of the revocation event and/or data deletion. This notification can be communicated to the program 112 by one or more of the revocation detection module 122, the data selection module 124, and the data deletion module 126. The notification allows the program 112 to take any appropriate action desired by the program 112 in response to the revocation event and/or data deletion. Examples of such actions include notifying the organization service 104 when the data has been deleted from the storage device 114, uninstalling the program 112, and so forth.

In one or more embodiments, the program 112 manages or otherwise controls the storage and retrieval of certain organization data, and this organization data is also referred to as organization data within the container of the program 112. However, additional organization data may not be within the container of the program, and this additional organization data can also be selected for deletion by the data selection module 124. This additional organization data can include encrypted data as well as unencrypted data. Thus, the data deletion module 126 is not limited to deleting only organization data within the container of the program 112, but can delete other organization data as well in response to a revocation event.

In one or more embodiments, the computing device 102 can synchronize data with one or more additional computing devices. These additional computing devices are typically other computing devices of the owner or use of the computing device 102. For example, a user may have a desktop computer at his or her office, a laptop computer at his or her home, and a smartphone, all of which synchronize data with one another and/or with the cloud (e.g., one or more network servers).

Figure 2:
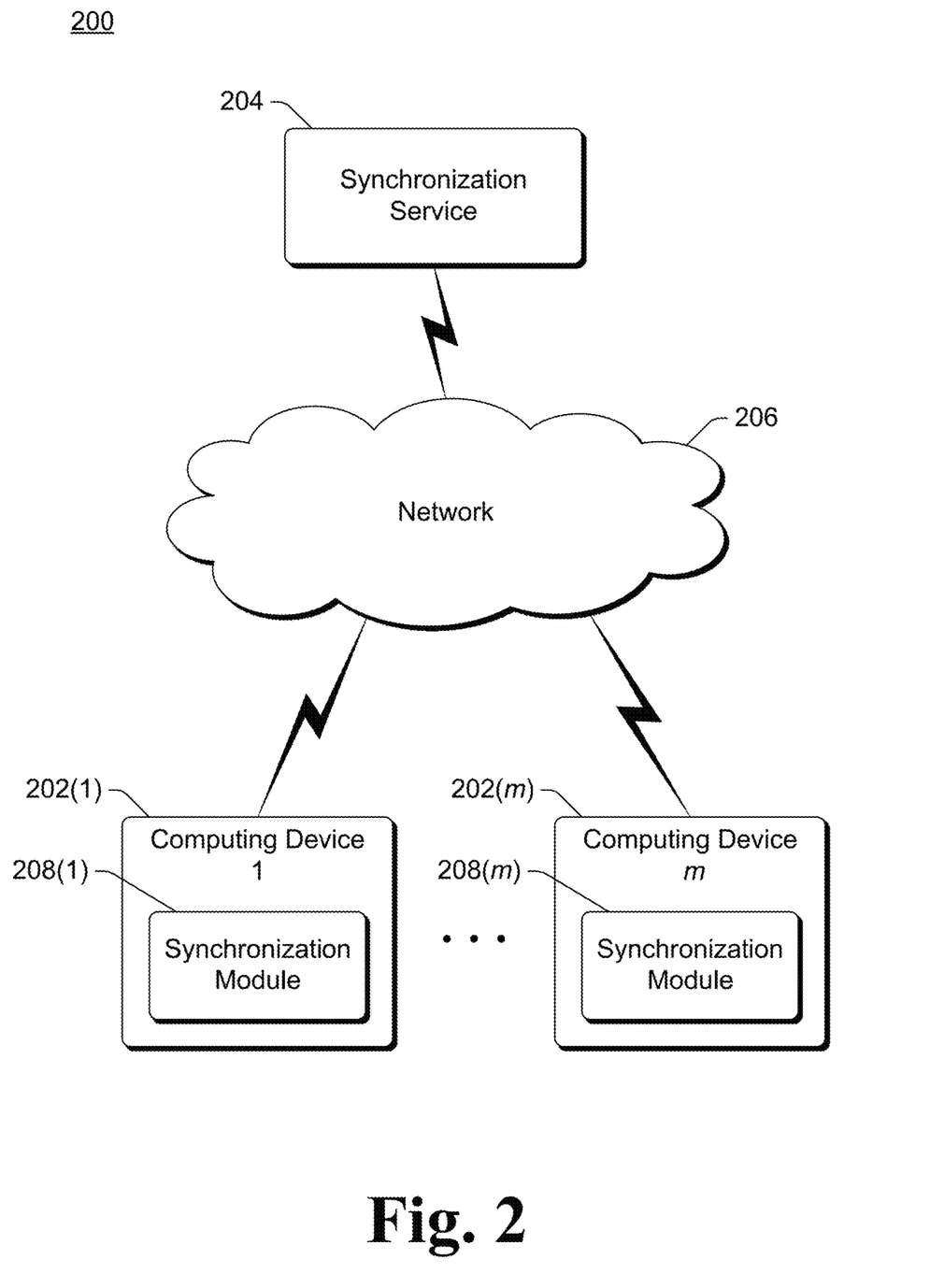
FIG. 2 illustrates an example system supporting data synchronization in accordance with one or more embodiments.

FIG. 2 illustrates an example system 200 supporting data synchronization in accordance with one or more embodiments. System 200 includes multiple (m) computing devices 202(1), ..., 202(m), a synchronization service 204, and a network 206. Each computing device 202 can be any of a variety of different types of computing devices as discussed above with reference to computing device 102 of FIG. 1. The synchronization service 204 can also be implemented by one or more of any of a variety of different types of computing devices as discussed above with reference to computing device 102 of FIG. 1. The network 206 can be any of a variety of different types of networks as discussed above with reference to network 106 of FIG. 1.

One or more of the computing devices 202 can be a computing device 102 of FIG. 1, and can include an organization data deletion system 116. However, one or more of the computing devices need not include an organization data deletion system 116. Each computing device 202 also includes a synchronization module 208(1), ..., 208(m). The synchronization modules 208 facilitate synchronization of data among the computing devices 202, allowing data that is added to one of the computing devices 202 to be automatically copied to others of the computing devices 202, allowing data that is deleted from one of the computing devices 202 to be automatically deleted from others of the computing devices 202, and so forth. The synchronization service 204 also facilitates synchronization of data among the computing devices 202, such as by allowing the computing devices 202 to identify one another, keeping track of which computing devices 202 are to be synchronized with which other computing devices 202, maintaining a copy of the data that is synchronized, and so forth. The computing devices 202 can synchronize data by copying data directly to the other computing devices 202 (optionally via the network 206) and/or by copying data to the synchronization service 204 that in turn copies the data to the other computing devices 202.

In one or more embodiments, the synchronization modules 208 and/or the synchronization service 204 synchronize organization data only with other computing devices 202 that are managed or otherwise approved to store organization data for the same organization. For example, different computing devices can be managed by the same organization (e.g., the employer of the user of the computing devices). An indication of whether a computing device is managed by the organization can be obtained in various manners, such as from the organization service 104 of FIG. 1. For example, if two of the user's computing devices (devices A and B) are managed by the same organization, but a third of the user's computing devices (device C) is not managed by that organization, then organization data for that organization is synchronized between computing devices A and B, but not to computing device C. Although organization data for that organization is not synchronized with computing device C, but other data (e.g., personal data, unencrypted data, possibly data associated with a different organization) can be synchronized with computing device C. By not synchronizing the organization data with the computing device C, there is no organization data on the computing device C to be deleted in the event of revocation of the organization data.

Furthermore, in one or more embodiments the synchronization modules 208 and/or the synchronization service 204 communicate with the organization data deletion system 116 that is included on at least one of the computing devices 202. As part of this communication, a determination is made as to whether data that is deleted from a particular computing device 202 is organization data being deleted in response to a revocation event. The data deletion is not synchronized to other computing devices 202 in response to the data being deleted in response to a revocation event, but the data deletion is synchronized to other computing devices 202 in response to the data being deleted due to some event other than a revocation event (e.g., a user input requesting to delete the data).

For example, assume that a user has two computing devices (devices A and B) that are managed by the same organization, so organization data is synchronized between those two computing devices. Further assume that the organization no longer desires to have computing device A managed by the organization (e.g., if the user is going to sell the device or give it to his daughter). A revocation event is sent to computing device A, and in response the organization data deletion system on computing device A deletes the organization data on computing device A. However, since those data deletions were in response to the revocation event, the data deletions are not synchronized with computing device B. Thus, computing device B, which is still managed by the organization and for which a revocation event has not been received, still has copies of the organization data.

Figure 3:
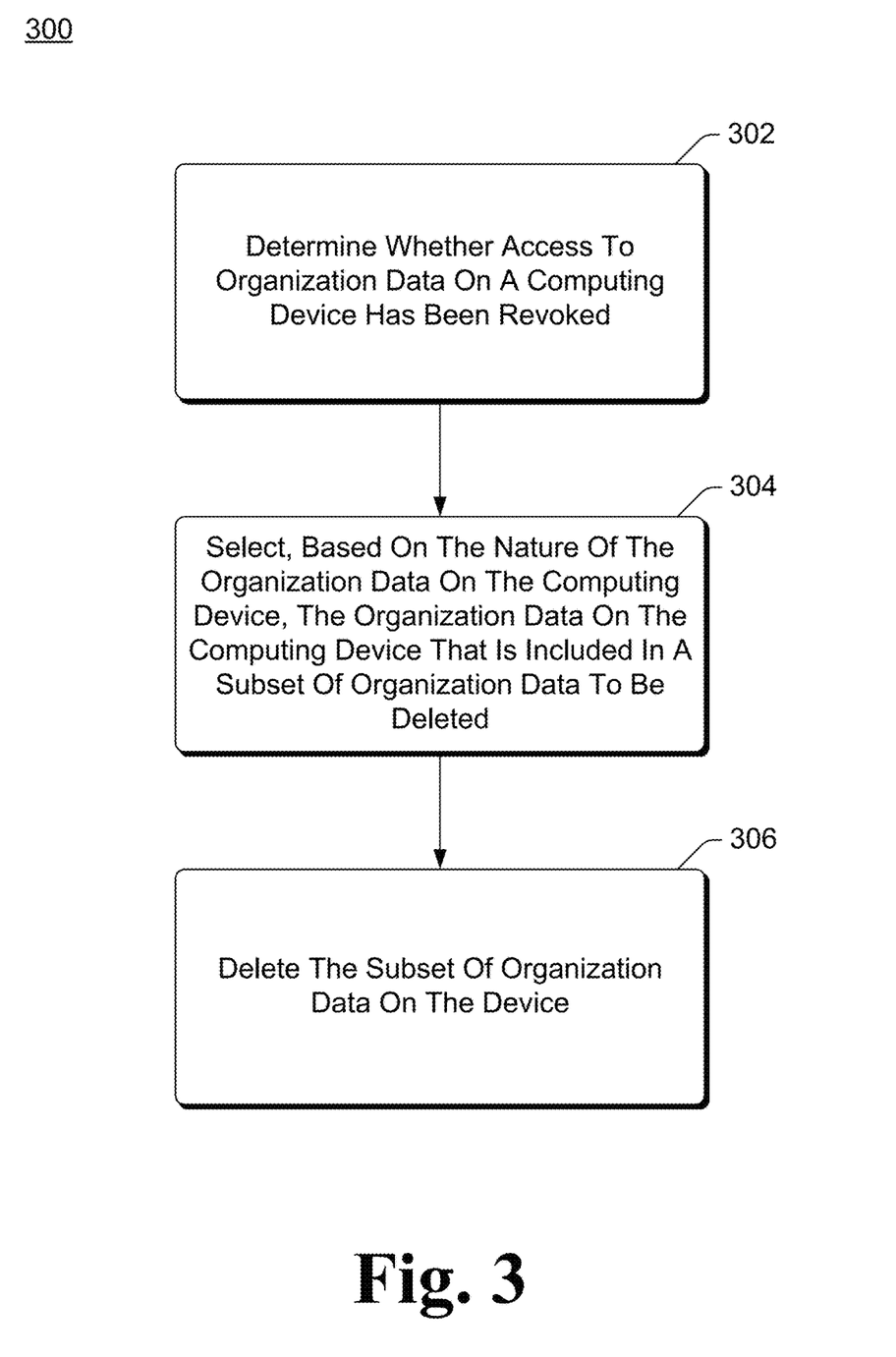
FIG. 3 is a flowchart illustrating an example process for intelligently deleting revoked data in accordance with one or more embodiments.

FIG. 3 is a flowchart illustrating an example process 300 for intelligently deleting revoked data in accordance with one or more embodiments. Process 300 is carried out by an organization data deletion system, such as the organization data deletion system 116 of FIG. 1, and can be implemented in software, firmware, hardware, or combinations thereof. Process 300 is shown as a set of acts and is not limited to the order shown for performing the operations of the various acts. Process 300 is an example process for intelligently deleting revoked data; additional discussions of intelligently deleting revoked data are included herein with reference to different figures.

In process 300, a determination of whether access to organization data on a computing device has been revoked is made (act 302). This determination can be made in a variety of different manners as discussed above.

In response to the determination being made that access to organization data has been revoked, the organization data that is included in a subset of organization data to be deleted is selected (act 304). The selection can be made based on a variety of different factors and characteristics of the organization data as discussed above.

The subset of organization data determined in act 304 is deleted from the computing device (act 306). This deletion can include deleting files, deleting metadata, deleting database entries, and so forth.

It should be noted that process 300 is performed automatically. Thus, when data on a computing device is revoked, the subset of data to be deleted is automatically determined and that subset is automatically deleted. The user need not expend time or effort attempting to figure out which data can be deleted and deleting that data.

In the discussions above, reference is made to deleting organization data in response to a revocation event. Additionally or alternatively, at least some organization data can be decrypted and remain stored on the computing device rather than being deleted from the computing device. For example, the data selection module can determine that a portion of a subset of data that was to be deleted is, rather than being deleted, to be decrypted and saved (in decrypted form). Which organization data can be decrypted and saved rather than deleted can be identified in any of variety of different manners analogous to determining which data is organization data, such as including an indication with the data itself, maintaining a separate list or record of such data, and so forth. The organization data that can be decrypted can be, for example, data that became organization data after being stored on the computing device (e.g., data that was initially stored decrypted on the computing device and subsequently encrypted as a result of the data becoming organization data, such as due to the computing device becoming associated with a particular organization).

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 4:
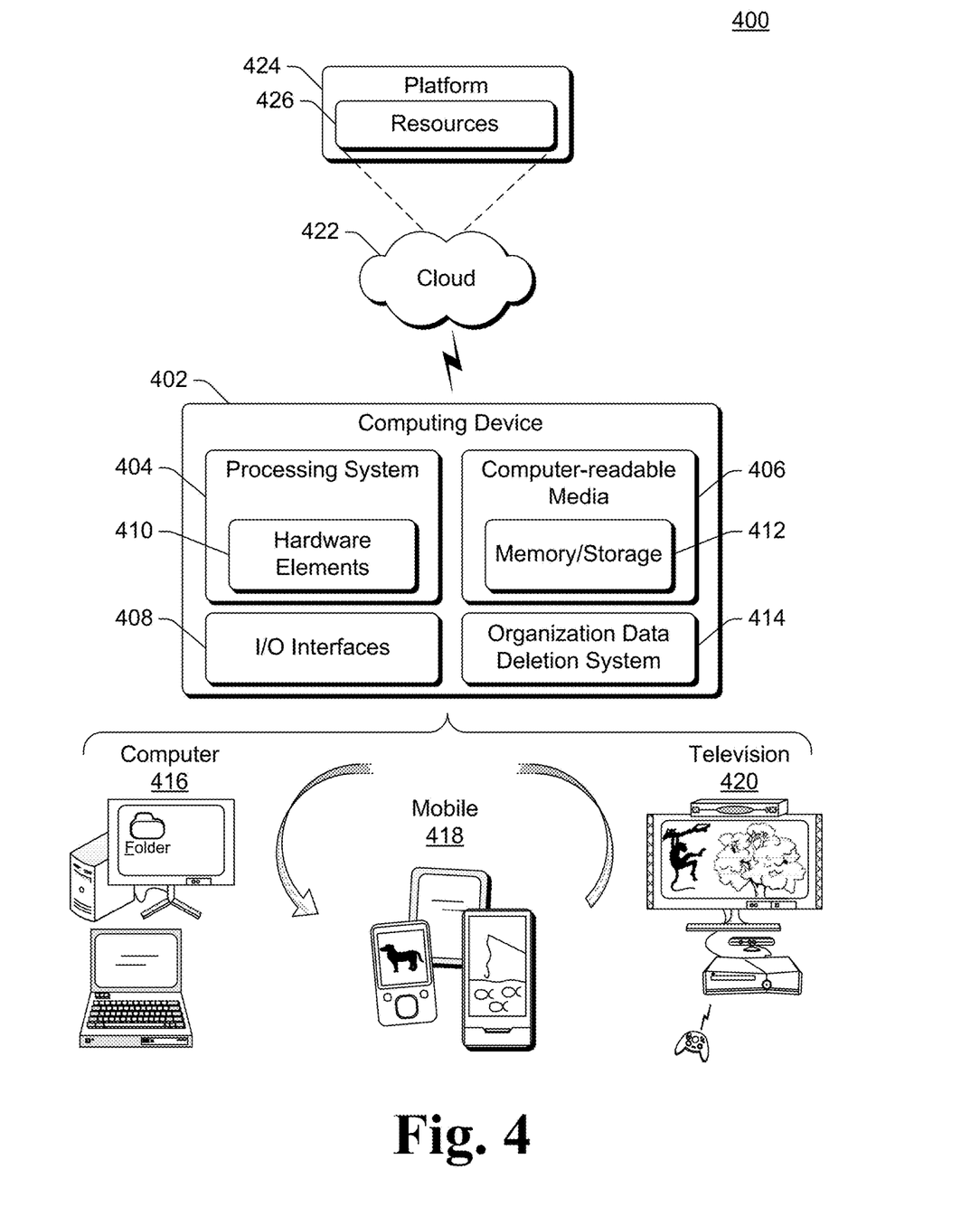
FIG. 4 illustrates an example system that includes an example computing device that is representative of one or more systems and/or devices that may implement the various techniques described herein.

FIG. 4 illustrates an example system generally at 400 that includes an example computing device 402 that is representative of one or more systems and/or devices that may implement the various techniques described herein. The computing device 402 may be, for example, a server of a service provider, a device associated with a client (e.g., a client device), an on-chip system, and/or any other suitable computing device or computing system.

The example computing device 402 as illustrated includes a processing system 404, one or more computer-readable media 406, and one or more I/O Interfaces 408 that are communicatively coupled, one to another. Although not shown, the computing device 402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 404 is representative of functionality to perform one or more operations using hardware. Accordingly, the processing system 404 is illustrated as including hardware elements 410 that may be configured as processors, functional blocks, and so forth. This may include implementation in hardware as an application specific integrated circuit or other logic device formed using one or more semiconductors. The hardware elements 410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 406 is illustrated as including memory/storage 412. The memory/storage 412 represents memory/storage capacity associated with one or more computer-readable media. The memory/storage 412 may include volatile media (such as random access memory (RAM)) and/or nonvolatile media (such as read only memory (ROM), Flash memory, optical disks, magnetic disks, and so forth). The memory/storage 412 may include fixed media (e.g., RAM, ROM, a fixed hard drive, and so on) as well as removable media (e.g., Flash memory, a removable hard drive, an optical disc, and so forth). The computer-readable media 406 may be configured in a variety of other ways as further described below.

The one or more input/output interface(s) 408 are representative of functionality to allow a user to enter commands and information to computing device 402, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 402 may be configured in a variety of ways as further described below to support user interaction.

The computing device 402 also includes an organization data deletion system 414. The organization data deletion system 414 facilitates intelligent deletion of revoked data as discussed above. The organization data deletion system 414 can implement, for example, the organization data deletion system 116 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 402. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 410 and computer-readable media 406 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 410. The computing device 402 may be configured to implement particular instructions and/or functions corresponding to the software and/or hardware modules. Accordingly, implementation of modules as a module that is executable by the computing device 402 as software may be achieved at least partially in hardware, e.g., through use of computer-readable storage media and/or hardware elements 410 of the processing system. The instructions and/or functions may be executable/operable by one or more articles of manufacture (for example, one or more computing devices 402 and/or processing systems 404) to implement techniques, modules, and examples described herein.

As further illustrated in FIG. 4, the example system 400 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 400, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 402 may assume a variety of different configurations, such as for computer 416, mobile 418, and television 420 uses. Each of these configurations includes devices that may have generally different constructs and capabilities, and thus the computing device 402 may be configured according to one or more of the different device classes. For instance, the computing device 402 may be implemented as the computer 416 class of a device that includes a personal computer, desktop computer, a multi-screen computer, laptop computer, netbook, and so on.

The computing device 402 may also be implemented as the mobile 418 class of device that includes mobile devices, such as a mobile phone, portable music player, portable gaming device, a tablet computer, a multi-screen computer, and so on. The computing device 402 may also be implemented as the television 420 class of device that includes devices having or connected to generally larger screens in casual viewing environments. These devices include televisions, set-top boxes, gaming consoles, and so on.

The techniques described herein may be supported by these various configurations of the computing device 402 and are not limited to the specific examples of the techniques described herein. This functionality may also be implemented all or in part through use of a distributed system, such as over a "cloud" 422 via a platform 424 as described below.

The cloud 422 includes and/or is representative of a platform 424 for resources 426. The platform 424 abstracts underlying functionality of hardware (e.g., servers) and software resources of the cloud 422. The resources 426 may include applications and/or data that can be utilized while computer processing is executed on servers that are remote from the computing device 402. Resources 426 can also include services provided over the Internet and/or through a subscriber network, such as a cellular or Wi-Fi network.

The platform 424 may abstract resources and functions to connect the computing device 402 with other computing devices. The platform 424 may also serve to abstract scaling of resources to provide a corresponding level of scale to encountered demand for the resources 426 that are implemented via the platform 424. Accordingly, in an interconnected device embodiment, implementation of functionality described herein may be distributed throughout the system 400. For example, the functionality may be implemented in part on the computing device 402 as well as via the platform 424 that abstracts the functionality of the cloud 422.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method implemented in a computing device, the method comprising: determining whether access to first organization data on the computing device has been revoked, the first organization data comprising data that is associated with an organization; selecting, in response to the access being revoked and based at least on a nature of the first organization data, second organization data on the computing device, the second organization data comprising a subset of the first organization data; and deleting the second organization data from a storage device of the computing device to conserve storage space in the storage device.

Alternatively or in addition to any of the above described methods, any one or combination of: the first organization data including one or more files on the computing device and/or one or more database entries on the computing device; the first organization data including metadata regarding other of the first organization data; the second organization data comprising data that is associated with revoked user credentials; the method further comprising prioritizing the second organization data so that second organization data that is more sensitive has a higher priority than second organization data that is less sensitive, and the deleting comprising deleting the higher priority second organization data before deleting lower priority second organization data; the method further comprising synchronizing the first organization data with one or more additional computing devices that are managed by a same organization as the computing device; the method further comprising: determining, for a data deletion at the computing device, whether the second organization data is being deleted in response to a revocation event, synchronizing the data deletion with the one or more additional computing devices in response to the second organization data being deleted other than in response to the revocation event, and not synchronizing the data deletion with the one or more additional computing devices in response to the second organization data being deleted in response to the revocation event; the method further comprising: maintaining a record that access to the first organization data on the computing device has been revoked, and performing the selecting and deleting for second organization data stored on a removable storage device in response to the removable storage device being connected to the computing device; the selecting the second organization data further comprising excluding, from the second organization data, first organization data that is still associated on the computing device with at least one valid credential, the valid credential corresponding to a user that is associated with the first organization data or an organization that is associated with the data; the method further comprising notifying one or more programs on the computing device that access to the first organization data on the computing device has been revoked to allow the one or more programs to take an appropriate responsive action; the second organization data including data for which the storage and retrieval is managed by a program that communicates with an organization service of the organization, as well as data for which the storage and retrieval is not managed by the program; the method further comprising: determining a portion of the second organization data that can be decrypted rather than deleted; and decrypting and saving the portion of the second organization data rather than deleting the portion of the second organization data.

A computing device method comprising: means for determining whether access to first organization data on the computing device has been revoked, the first organization data comprising data that is associated with an organization; means for selecting, in response to the access being revoked and based at least on a nature of the first organization data, second organization data on the computing device, the second organization data comprising a subset of the first organization data; and means for deleting the second organization data from a storage device of the computing device to conserve storage space in the storage device.

A computing device comprising: a storage device configured to store first organization data that is associated with an organization; a revocation detection module configured to determine whether access to the first organization data on the computing device has been revoked; a data selection module configured to receive an indication from the revocation detection module that access to the first organization data has been revoked, and to select, in response to the access being revoked and based at least on a nature of the first organization data, second organization data on the computing device that is to be deleted, the second organization data comprising at least a portion of the first organization data; and a data deletion module configured to receive an indication from the data selection module with respect to the second organization data and to delete from the computing device the second organization data to conserve storage space in the storage device.

Alternatively or in addition to any of the above described computing devices, any one or combination of: the second organization data including one or more files on the computing device and/or one or more database entries on the computing device; the second organization data including metadata regarding other of the second organization data; the computing device further comprising a synchronization module to synchronize the first organization data with one or more additional computing devices that are managed by a same organization as the computing device, the data selection module being further to: determine, for a data deletion at the computing device, whether the second organization data is being deleted in response to a revocation event, synchronize the data deletion with the one or more additional computing devices in response to the second organization data being deleted other than in response to the revocation event, and not synchronize the data deletion with the one or more additional computing devices in response to the second organization data being deleted in response to the revocation event; the data selection module being further configured to: maintain a record that access to the first organization data on the computing device has been revoked, and select, and indicate to the data deletion module to delete, the second organization data on a removable device connected to the computing device in response to the removable device being connected to the computing device.

A computing device comprising: a storage device configured to store first organization data that is associated with an organization; a data selection module configured to select second organization data for deletion from the computing device in response to access to the first organization data on the computing device having been revoked, the second organization data comprising a subset of the first organization data, the selection of the second organization data comprising excluding from the second organization data any of the first organization data that is still associated with at least one valid credential, the at least one valid credential corresponding to one or more users that are associated with the organization data or an organization that is associated with the data; and a data deletion module configured to receive an indication from the data selection module of the second organization data and delete from the computing device the second organization data to conserve storage space in the storage device.

Alternatively or in addition to any of the above described computing devices, any one or combination of: the data selection module being further configured to determine a portion of the second organization data that can be decrypted rather than deleted, and indicate to a decryption module to decrypt and save the portion of the second organization data rather than indicate to the data deletion module to delete the portion of the second organization data; the data selection module being further configured to prioritize the subset of the second organization data so that second organization data that is more sensitive has a higher priority than second organization data that is less sensitive, and the data deletion module being further configured to delete the higher priority second organization data before deleting lower priority second organization data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
   determining, based on an indication received from an organization, that access to first organization data on the computing device has been revoked, the first organization data comprising data that is tagged as being associated with the organization;
   determining a first subset of the first organization data still associated with one or more valid credentials, the one or more valid credentials corresponding to a user that is associated with the first organization data or a different organization that is associated with the data;
   selecting, in response to the access being revoked, second organization data on the computing device associated with revoked user credentials, the second organization data comprising a second subset of the first organization data that does not have at least one valid credential associated with the first organization data, the first and second subsets being mutually exclusive; and
   deleting the second organization data from the computing device.

2. The method as recited in claim 1, the first organization data including one or more files on the computing device and/or one or more database entries on the computing device.

3. The method as recited in claim 1, the first organization data including metadata related to the first organization data.

4. The method as recited in claim 1, the indication that access to the first organization data has been revoked comprising an expiration date for the revoked user credentials.

5. The method as recited in claim 1, further comprising prioritizing the second organization data so that second organization data that is more sensitive has a higher priority than second organization data that is less sensitive, and the deleting comprising deleting the higher priority second organization data before deleting lower priority second organization data.

6. The method as recited in claim 1, further comprising synchronizing the first organization data with one or more additional computing devices that are managed by a same organization as the computing device.

7. The method as recited in claim 6, further comprising:
   determining, for a data deletion at the computing device, whether the second organization data is being deleted in response to a revocation event;
   synchronizing the data deletion with the one or more additional computing devices in response to the second organization data being deleted other than in response to the revocation event; and
   not synchronizing the data deletion with the one or more additional computing devices in response to the second organization data being deleted in response to the revocation event.

8. The method as recited in claim 1, further comprising:
   maintaining a record that access to the first organization data on the computing device has been revoked; and
   performing the selecting and deleting for second organization data stored on a removable storage device in response to the removable storage device being connected to the computing device.

9. The method as recited in claim 1, wherein the first organization data being tagged comprises embedding a tag in the first organization data.

10. The method as recited in claim 1, further comprising notifying one or more programs on the computing device that access to the first organization data on the computing device has been revoked to allow the one or more programs to take an appropriate responsive action.

11. The method as recited in claim 1, the second organization data including data for which the storage and retrieval is managed by a program that communicates with an organization service of the organization, as well as data for which the storage and retrieval is not managed by the program.

12. The method as recited in claim 1, further comprising:
   determining a portion of the second organization data that can be decrypted rather than deleted; and
   decrypting and saving the portion of the second organization data rather than deleting the portion of the second organization data.

13. A computing device comprising:
a storage device configured to store first organization data that includes an embedded tag indicating the first organization data is associated with an organization;
a revocation detector configured to determine whether access to the first organization data on the computing device has been revoked based on an indication from the organization;
a data selector configured to:
  receive an indication from the revocation detector that access to the first organization data has been revoked, and
  select, in response to the access being revoked, second organization data associated with revoked user credentials on the computing device that is to be deleted, the second organization data comprising at least a portion of the first organization data, the portion of the first organization data comprising a set of data that is not associated with at least one valid user credential; and
a data deletion module configured to receive an indication from the data selector with respect to the second organization data and to delete from the computing device the second organization data.

14. The computing device as recited in claim 13, the second organization data including one or more files on the computing device and/or one or more database entries on the computing device.

15. The computing device as recited in claim 13, the second organization data including metadata.

16. The computing device as recited in claim 13, the computing device further comprising a synchronization module to synchronize the first organization data with one or more additional computing devices that are managed by a same organization as the computing device, the data selector being further to:
  determine, for a data deletion at the computing device, whether the second organization data is being deleted in response to a revocation event;
  synchronize the data deletion with the one or more additional computing devices in response to the second organization data being deleted other than in response to the revocation event; and
  not synchronize the data deletion with the one or more additional computing devices in response to the second organization data being deleted in response to the revocation event.

17. The computing device as recited in claim 13, the data selector being further configured to:
  maintain a record that access to the first organization data on the computing device has been revoked; and
  select, and indicate to the data deletion module to delete, the second organization data on a removable device connected to the computing device in response to the removable device being connected to the computing device.

18. A computing device comprising:
a storage device configured to store first organization data embedded with a tag indicating that the first organization data is associated with an organization;
a data selector configured to select second organization data associated with revoked user credentials for deletion from the computing device in response to access to the first organization data on the computing device having been revoked by the organization, the second organization data comprising a subset of the first organization data, the selection of the second organization data comprising selecting, for the second organization data, any of the first organization data that is not associated with at least one valid credential, a remaining portion of the first organization data not selected for deletion, the remaining portion associated with at least one valid credential corresponding to one or more users that are associated with the organization data or an organization that is associated with the data; and
a data deletion module configured to receive an indication from the data selector of the second organization data and delete from the computing device the second organization data.

19. The computing device as recited in claim 18, the data selector being further configured to determine a portion of the second organization data that can be decrypted rather than deleted, and indicate to a decryption module to decrypt and save the portion of the second organization data rather than indicate to the data deletion module to delete the portion of the second organization data.

20. The computing device as recited in claim 18, the data selector being further configured to prioritize the subset of the second organization data so that second organization data that is more sensitive has a higher priority than second organization data that is less sensitive, and the data deletion module being further configured to delete the higher priority second organization data before deleting lower priority second organization data.

* * * * *